(12) United States Patent
Shigeta

(10) Patent No.: US 7,424,231 B2
(45) Date of Patent: Sep. 9, 2008

(54) INFORMATION PROCESSING APPARATUS, INFORMATION PROCESSING METHOD, AND PROGRAM

(75) Inventor: Yasushi Shigeta, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 11/143,341

(22) Filed: Jun. 2, 2005

(65) Prior Publication Data

US 2005/0271399 A1    Dec. 8, 2005

(30) Foreign Application Priority Data

Jun. 8, 2004    (JP)    ............... 2004-170463

(51) Int. Cl.
*G03G 15/00*    (2006.01)
(52) U.S. Cl. .......................................... 399/8
(58) Field of Classification Search ............... 399/8
See application file for complete search history.

(56) References Cited

U.S. PATENT DOCUMENTS

| | | | | |
|---|---|---|---|---|
| 5,708,909 | A | * | 1/1998 | Yamashita et al. ............ 399/8 |
| 5,873,009 | A | * | 2/1999 | Yamashita et al. ............ 399/8 |
| 5,890,029 | A | * | 3/1999 | Hirata et al. ................. 399/8 |
| 2003/0195951 | A1 | * | 10/2003 | Wittel et al. ................ 709/220 |

FOREIGN PATENT DOCUMENTS

| | | | |
|---|---|---|---|
| JP | 8-84194 | A | 3/1996 |
| JP | 2000-59557 | A | 2/2000 |
| JP | 2000-66553 | A | 3/2000 |
| JP | 2000-181302 | A | 6/2000 |
| JP | 2001-36676 | A | 2/2001 |
| JP | 2001036676 | A | * 2/2001 |
| JP | 2004-015680 | A | 1/2004 |
| JP | 2004-032723 | A | 1/2004 |

\* cited by examiner

*Primary Examiner*—David M Gray
*Assistant Examiner*—Bryan Ready
(74) *Attorney, Agent, or Firm*—Canon U.S.A. Inc., I.P. Division

(57) ABSTRACT

A management computer communicates with devices and an apparatus connected to a LAN through a LAN communication unit. A counter information obtaining unit obtains counter information of the devices through the LAN communication unit. A network information obtaining unit obtains network information from a DHCP server through the LAN communication unit. A Simple Object Access Protocol message generator generates a Simple Object Access Protocol message and a Simple Object Access Protocol communication unit transmits the Simple Object Access Protocol message to a service center through the Internet. A Simple Object Access Protocol message analyzer analyzes the Simple Object Access Protocol message received by the Simple Object Access Protocol communication unit from the service center through the Internet.

14 Claims, 17 Drawing Sheets

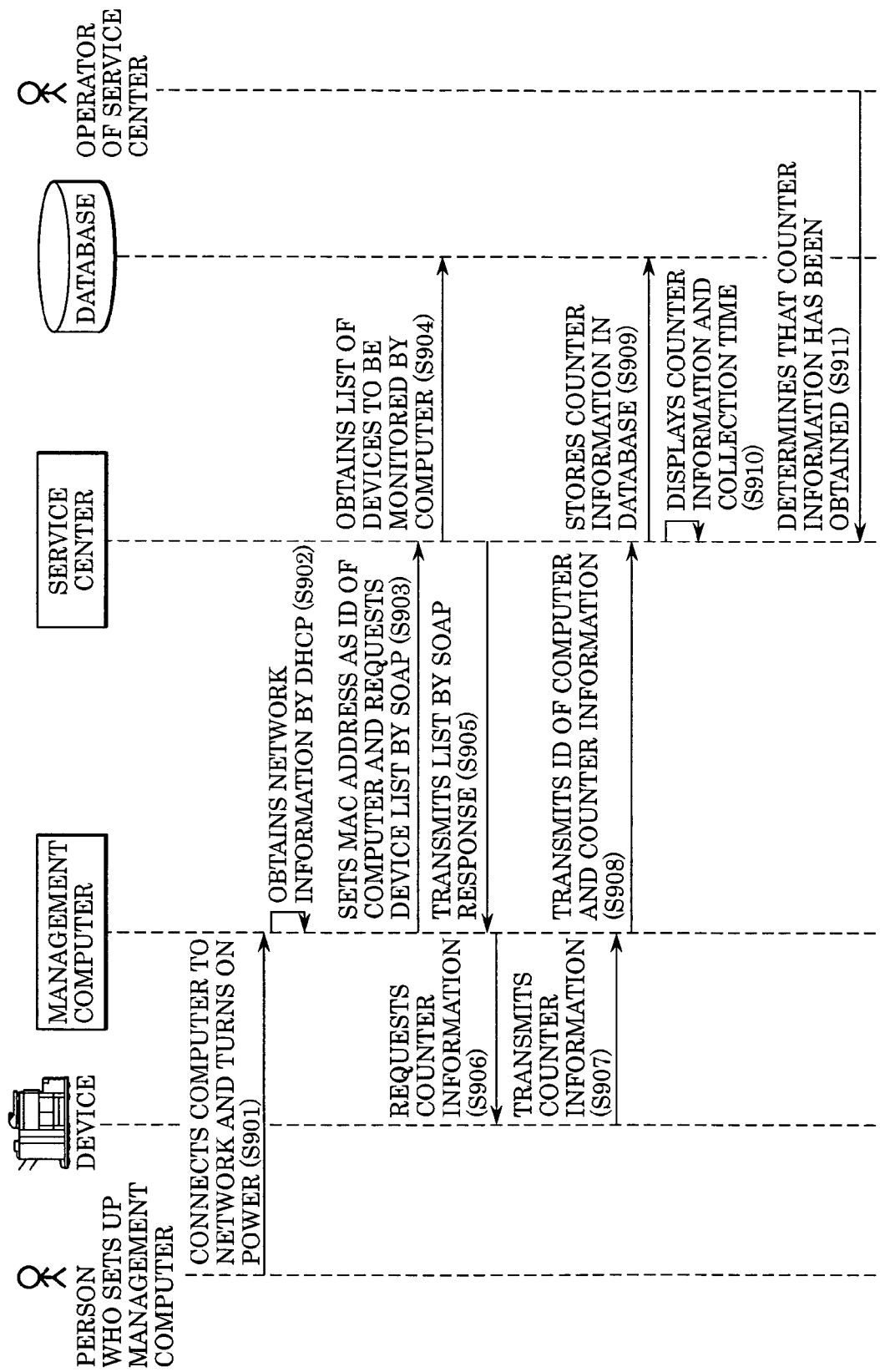

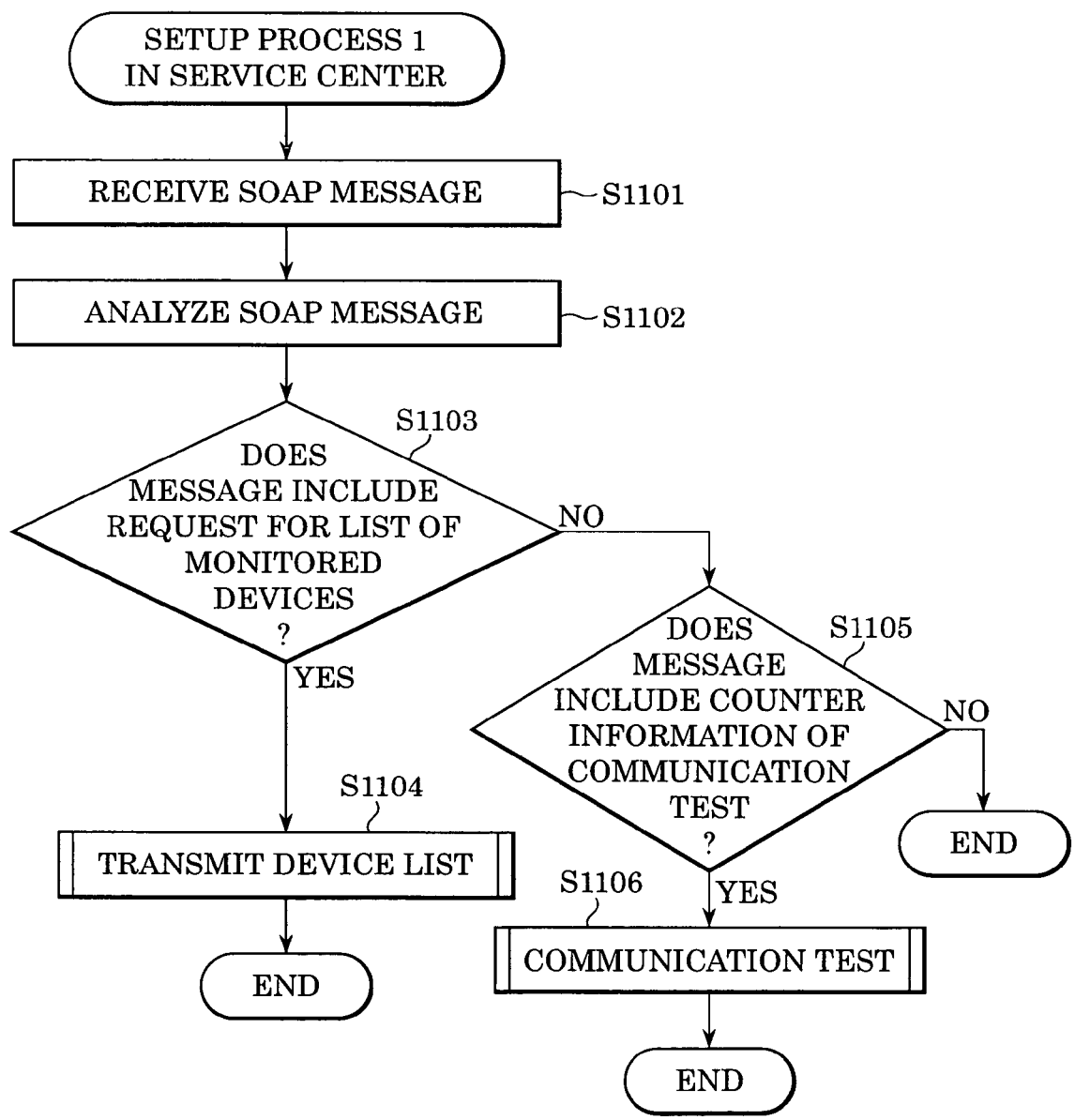

FIG. 10

| MANAGEMENT COMPUTER ID | TIMEOUT |
|---|---|
| 000001 | 11:15:13 |
| 000002 | 11:15:20 |
| 000003 | 11:15:23 |
| ⋮ | ⋮ |
| 000009 | 11:15:29 |

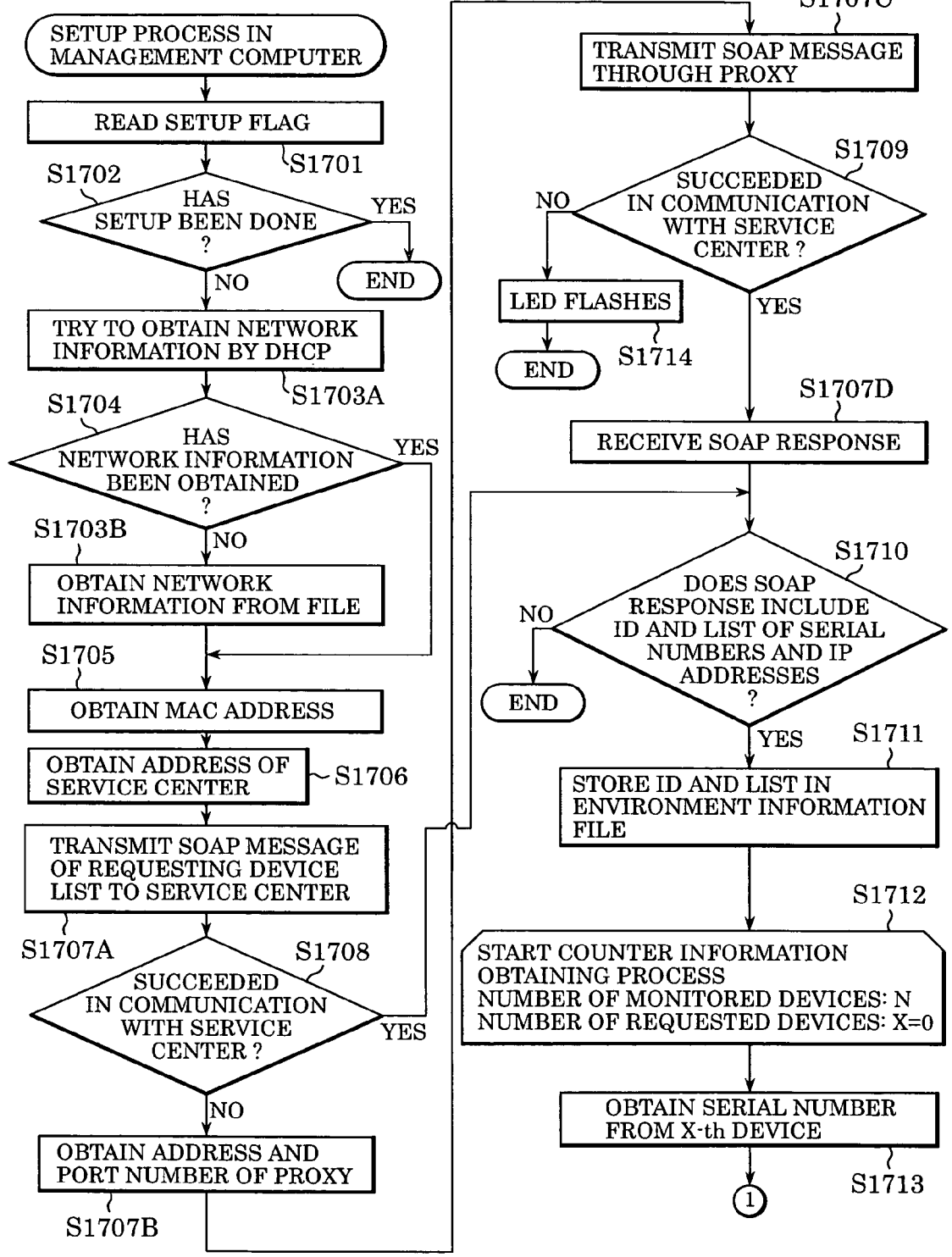

FIG. 15 getConfiguration
(Message of requesting a list of monitored devices)

Parameter

| Mac address of management computer |
|---|

FIG. 16 getConfigurationResponse
(Message of responding to request)

Parameter

| Management computer ID |
|---|
| Serial number of monitored device 1 |
| IP address of monitored device 1 |
| Serial number of monitored device 2 |
| IP address of monitored device 2 |
| ⋮ |
| Serial number of monitored device n |
| IP address of monitored device n |

FIG. 17 communicationTest
(Communication test message)

Parameter

| |
|---|
| Management computer ID |
| Serial number of monitored device 1 |
| Counter value of monitored device 1 |
| Serial number of monitored device 2 |
| Counter value of monitored device 2 |
| ⋮ |
| Serial number of monitored device n |
| Counter value of monitored device n |

FIG. 18 communicationTestResponse
(Communication test response message)

Parameter

| |
|---|
| Acquisition of counter information(OK or error) |

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program. More specifically, the present invention relates to an information processing apparatus, an information processing method, and a program which simplify initial settings and management of image forming devices connected to a network.

2. Description of the Related Art

Hitherto, a remote maintenance system for managing image forming devices in a remote location, such as copiers and printers, has been known. In this system, status of the image forming devices is transmitted to a remote service center so that the service center can remotely monitor the devices.

For example, Japanese Patent Laid-Open No. 08-84194 discloses a system of setting a copier at a location, registering information about a user and a model name in a host computer of a dealer, and then transferring the registered information from the dealer to a host computer of a leasing company.

On the other hand, in a system disclosed in Japanese Patent Laid-Open No. 2000-59557, various information is transmitted from a facsimile machine to a center and the information is registered therein, so that the center holds a setting information file of the facsimile machine to save time and trouble of inputting. After checking the necessity of correction of registered items, the center uploads contact information in case of errors to the facsimile machine so as to reduce a burden of initial settings of an image forming device.

Further, Japanese Patent Laid-Open No. 2000-066553 discloses the following system. Before a model of an image forming device is changed, a center automatically determines whether a CE code has been registered and user setting data (e.g., user's address) can be used for an image forming device of a new model. If it is determined to be possible, the user setting data is downloaded to the image forming device of the new model.

Still further, Japanese Patent Laid-Open No. 2001-36676discloses the following system. A management computer that manages a plurality of image forming devices queries the devices as to whether a device number (management number) has been registered therein. When receiving a response indicating "unregistered", the management computer automatically assigns a device number to the image forming device. This system aims to reduce a burden on a service person to manage device numbers, which are required for communication between the management computer and the image forming devices.

However, in the above-described system of transmitting various information from a facsimile machine to a center and registering the information in the center and the system of downloading user setting data to an image forming device of a new model, information relating to initial settings can be downloaded from the center to only a single image forming device to be newly set up. Therefore, in order to set up a plurality of image forming devices, the same setup process must be repeated for each of the devices. This results in an increase in burden and time of processing.

According to the above-described system of automatically assigning a device number to an image forming device, a plurality of image forming devices can be managed. However, this technique is based on the premise that a management computer for managing the plurality of image forming devices has already been set up. Further, in order to assign a unique number to each image forming device, the management computer sends a request to each device to transmit a registered number and assigns a new number if no response returns.

SUMMARY OF THE INVENTION

Accordingly, the present invention is conceived as a response to the above-described disadvantages of the conventional art.

The present invention provides a system of efficiently setting a management computer which manages a plurality of image forming devices and reducing a burden on a service person.

According to one aspect of the present invention, an information processing apparatus includes: a communication unit configured to communicate with a service center and a plurality of image forming devices through a network; a storage unit configured to store identifying information of the information processing apparatus and communication information of the service center; a device identifying information receiving unit configured to read the communication information from the storage unit, which is configured to access the service center through the network by using address information of the service center included in the communication information and the identifying information of the information processing apparatus, and to receive device identifying information from the service center, the device identifying information identifying the respective image forming devices set in the service center while being associated with the identifying information of the information processing apparatus; a test unit configured to perform a communication test on the plurality of image forming devices corresponding to the device identifying information received by the receiving unit; and a device managing unit configured to manage the plurality of image forming devices connected through the network based on the device identifying information.

With this configuration, a management computer which manages a plurality of image forming devices can be efficiently set up and a burden on a service person can be reduced.

Other features and advantages of the present invention will be apparent from the following description taken in conjunction with the accompanying drawings, in which like reference characters designate the same or similar parts throughout the figures.

BRIEF DESCRIPTION OF THE DRAWINGS

FIG. 4 shows an example of a sequence of the system.

FIG. 6 is a flowchart showing a process performed in a service center according to the first embodiment.

FIG. 10 shows an example of a communication test standby list file.

FIGS. 12A and 12B show a flowchart of a process performed in a management computer according to the second embodiment.

FIG. 15 shows a specific example of a SOAP (Simple Object Access Protocol) message.

FIG. 16 shows a specific example of a SOAP message.

FIG. 17 shows a specific example of a SOAP message.

FIG. 18 shows a specific example of a SOAP message.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
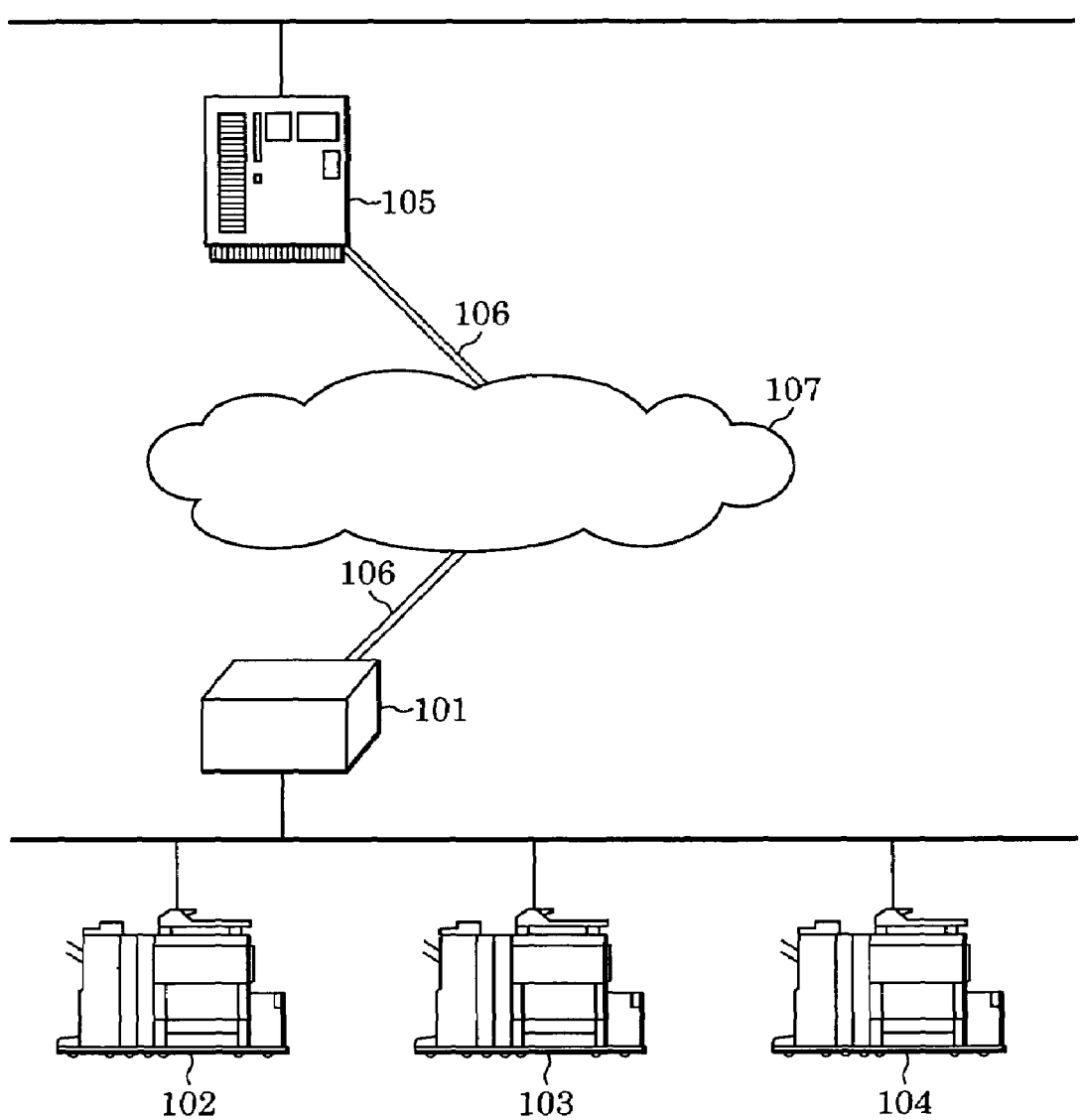
FIG. 1 is a view showing a system according to a first embodiment of the present invention.

A first embodiment of the present invention will be described with reference to FIGS. 1 to 10. FIG. 1 is a view showing a system according to this embodiment. In this system, a remote monitoring computer functioning as a service center 105 and a management computer 101 are capable of communicating with each other through a communication medium 106, such as the Internet, by using a network 107 of a predetermined protocol. In order to prevent unauthorized accesses and to realize communication through a firewall, a general protocol (e.g., HyperText Transfer Protocol (HTTP)) and authentication are used.

Although only one management computer 101 is shown in FIG. 1, a plurality of management computers actually exist. These management computers 101 can communicate with the remote monitoring computer 105, which collectively manages the management computers, through a communication medium.

In FIG. 1, devices 102, 103, and 104 are image forming devices, such as a printer (electrophotographic or inkjet), a scanner, a facsimile machine, and a digital multifunction device having printer/facsimile functions. The management computer 101 collects information about these devices 102 to 104, such as a failure status, the number of printed sheets, and the number of printed pages.

Figure 2:
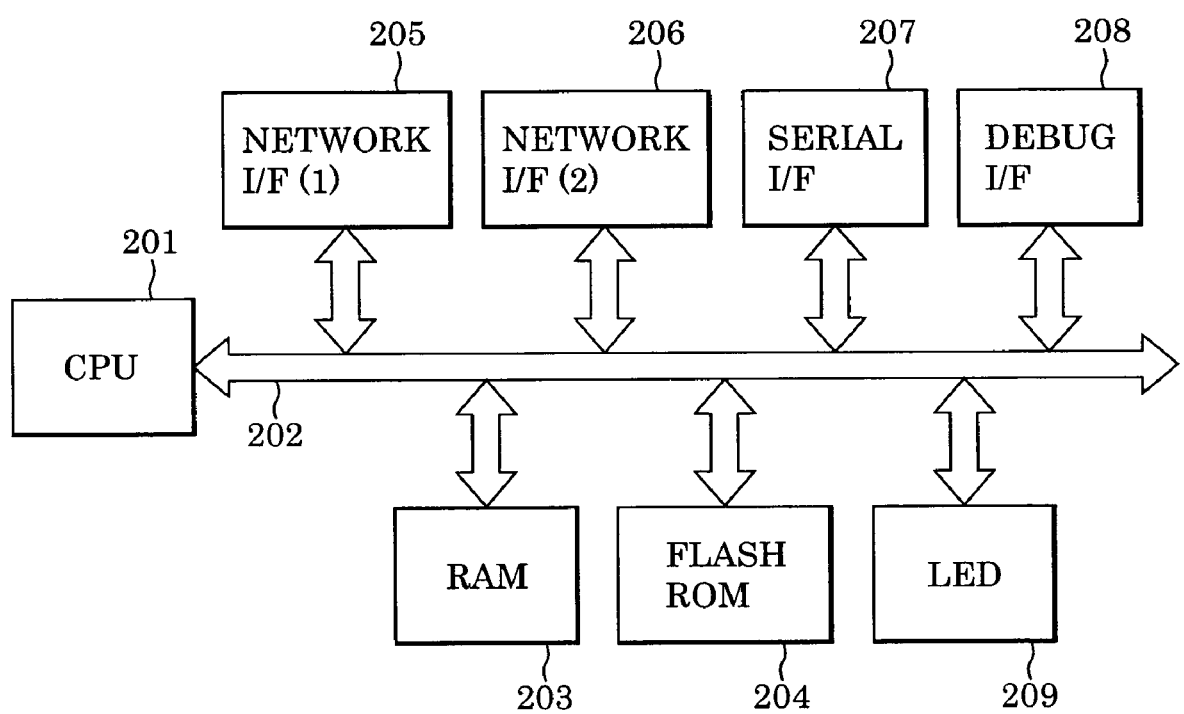
FIG. 2 is a block diagram showing a hardware configuration of a management computer according to the first embodiment.

FIG. 2 is a block diagram showing an example of a hardware configuration of the management computer 101 or the service center 105 shown in FIG. 1. In other words, FIG. 2 shows a configuration of a typical information processing apparatus. The management computer 101 includes a CPU (central processing unit) 201; a bus 202 for transmitting data between components (described later); a RAM (random access memory) 203 capable of electrically storing and rewriting information; a flash ROM (read only memory) 204 capable of electrically rewriting information and storing information even when a power is turned off; network interfaces (I/F) 205 and 206 for exchanging information with outside devices through a network; a serial interface (I/F) 207 for exchanging information by RS232C serial communication; and a debug interface (I/F) 208 serving as a serial communication unit used for debug.

Figure 3:
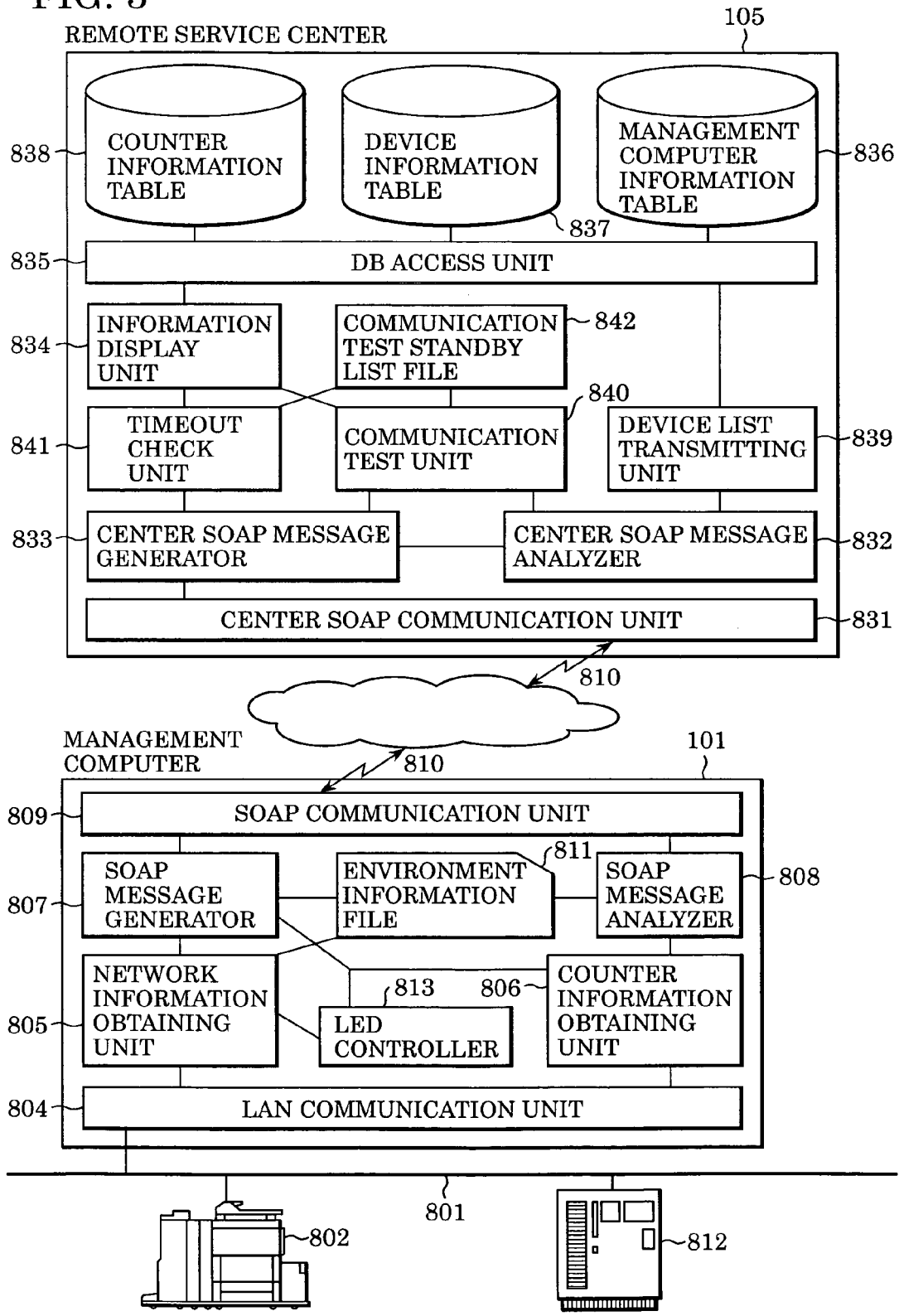
FIG. 3 shows a system configuration according to the first embodiment.

FIG. 3 shows an exemplary configuration of the system according to the first embodiment. A network 801 connects devices 802 (only one of them is shown in FIG. 3) and the management computer 101. The network 801 may be either a wireless or wired communication medium as long as it enables communication among a plurality of devices. Each of the devices 802 connects to the network 801 and serves as, for example, a printer, a facsimile, a copier, or a multifunction device. The management computer 101 manages and monitors the devices 802 and is typically placed in the same company premises as the devices 802.

A LAN communication unit 804 is used when the management computer 101 communicates with a device connected to a LAN (local area network). A counter information obtaining unit 806 obtains counter information of a device through the LAN communication unit 804. Now, a function of a counter is specifically described. The counter counts the number of image forming operations performed in an image forming device, for example, the number of printed pages (the number of printed physical pages) or the number of scanning operations in which a scanner or the like reads a document. The obtained information (counter information) includes attributes, such as a paper size and a date. When a license of an application which operates in an image forming device is managed, the counter information may include the number of times the application is used.

A network information obtaining unit 805 obtains network information from a DHCP (dynamic host configuration protocol) server 812 through the LAN communication unit 804. A SOAP (simple object access protocol) message generator 807 generates a SOAP message based on XML (extensible markup language) and HTTP. The SOAP message is transmitted by a SOAP communication unit 809 to the service center 105 through the Internet 810. When a firewall of refusing accesses from outsiders is set in a network environment of a client, the SOAP can be advantageously adopted to provide instructions from a management computer to a subjective service center. The management computer can provide various instructions to the service center by an e-mail or the like. However, by using the SOAP, settings on an e-mail server need not be performed and a more efficient management computer setup environment can be realized.

In this embodiment, the SOAP is used for communication between the management computer 101 and the service center 105 by taking advantage of the SOAP, which does not depend on a network system. Other protocols for individual systems may also be used as long as an operator can easily perform initial settings without inputting an address and so on. For example, a message exchange protocol which does not depend on a network system may be used.

A SOAP message analyzer 808 analyzes a SOAP message. Specifically, the SOAP message analyzer 808 analyzes a SOAP message received by the SOAP communication unit 809 from the service center 105 through the Internet 810. An environment information file 811 stores environment information as communication information, that is, data required for operating the management computer 101. The environment information file 811 is accessed by the SOAP message generator 807 and the SOAP message analyzer 808, so that data is read therefrom or written therein.

The service center 105 remotely monitors the devices 802 through the management computer 101. A center SOAP message generator 833 generates a SOAP message by reading data from a device information table 837 and a management computer information table 836 through a DB (database) access unit 835. A center SOAP communication unit 831 communicates with the management computer 101 through the Internet 810 to transmit a generated SOAP message and to receive a response, which is transmitted to a center SOAP message analyzer 832.

Herein, the service center 105 is a typical information processing apparatus. Software which functions as a service center may be installed into an information processing apparatus used for another purpose. Further, the service center may be composed of a plurality of information processing apparatuses if the apparatuses are logically related to each other. That is, the configuration of the service center is not limited to a specific one as long as it can realize the functions shown in FIG. 3.

The center SOAP message analyzer 832 analyzes device information included in a SOAP message to extract counter information of monitored devices and stores the counter information in a counter information table 838 through the DB access unit 835. An information display unit 834 reads data from the tables 836, 837, and 838 through the DB access unit 835 and displays the counter information of the devices 802 monitored by the management computer 101 on a screen (not shown).

Figure 5A:
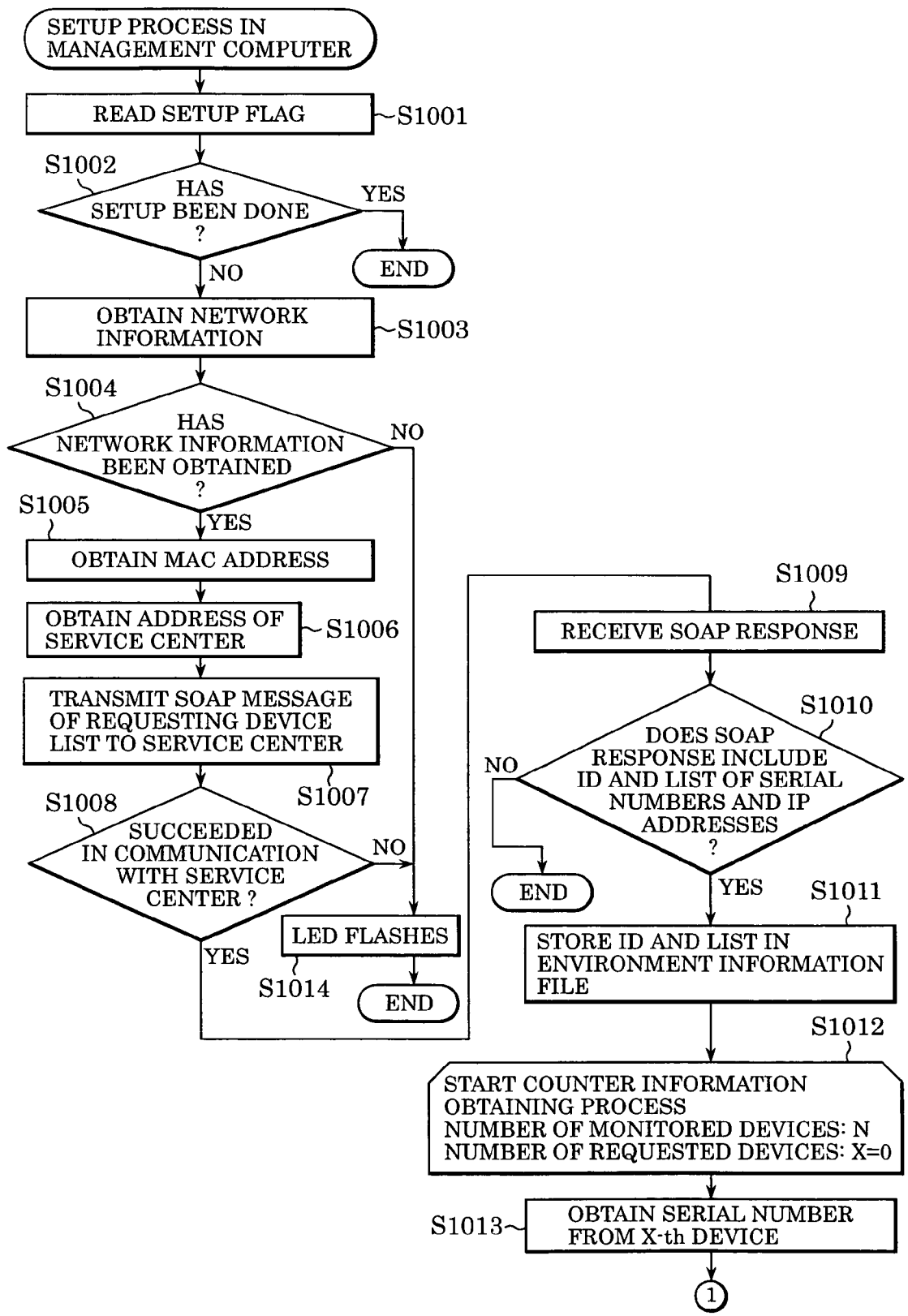
FIGS. 5A and 5B show a flowchart of a process performed in the management computer according to the first embodiment.
Figure 5B:
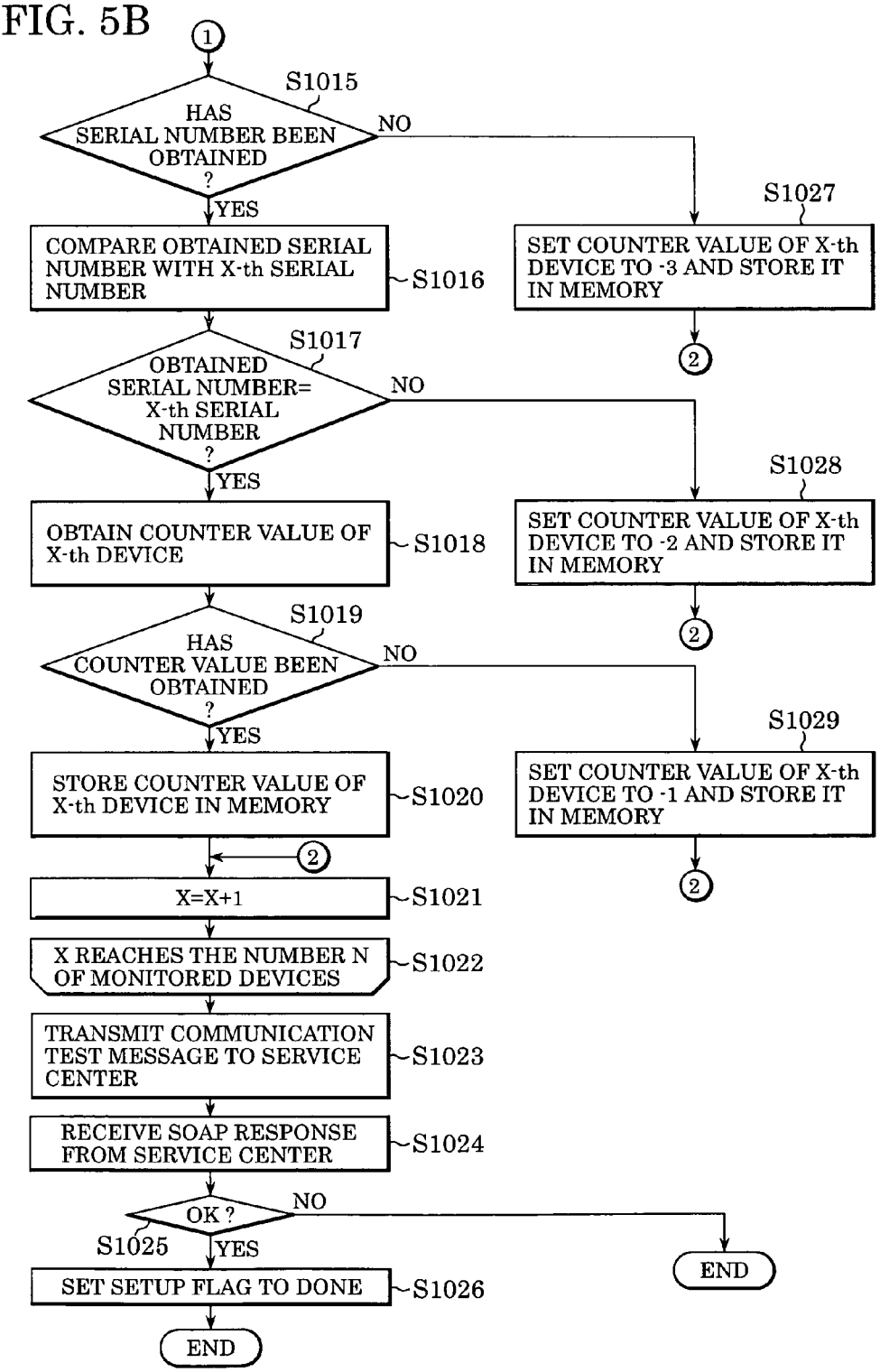
Figure 7:
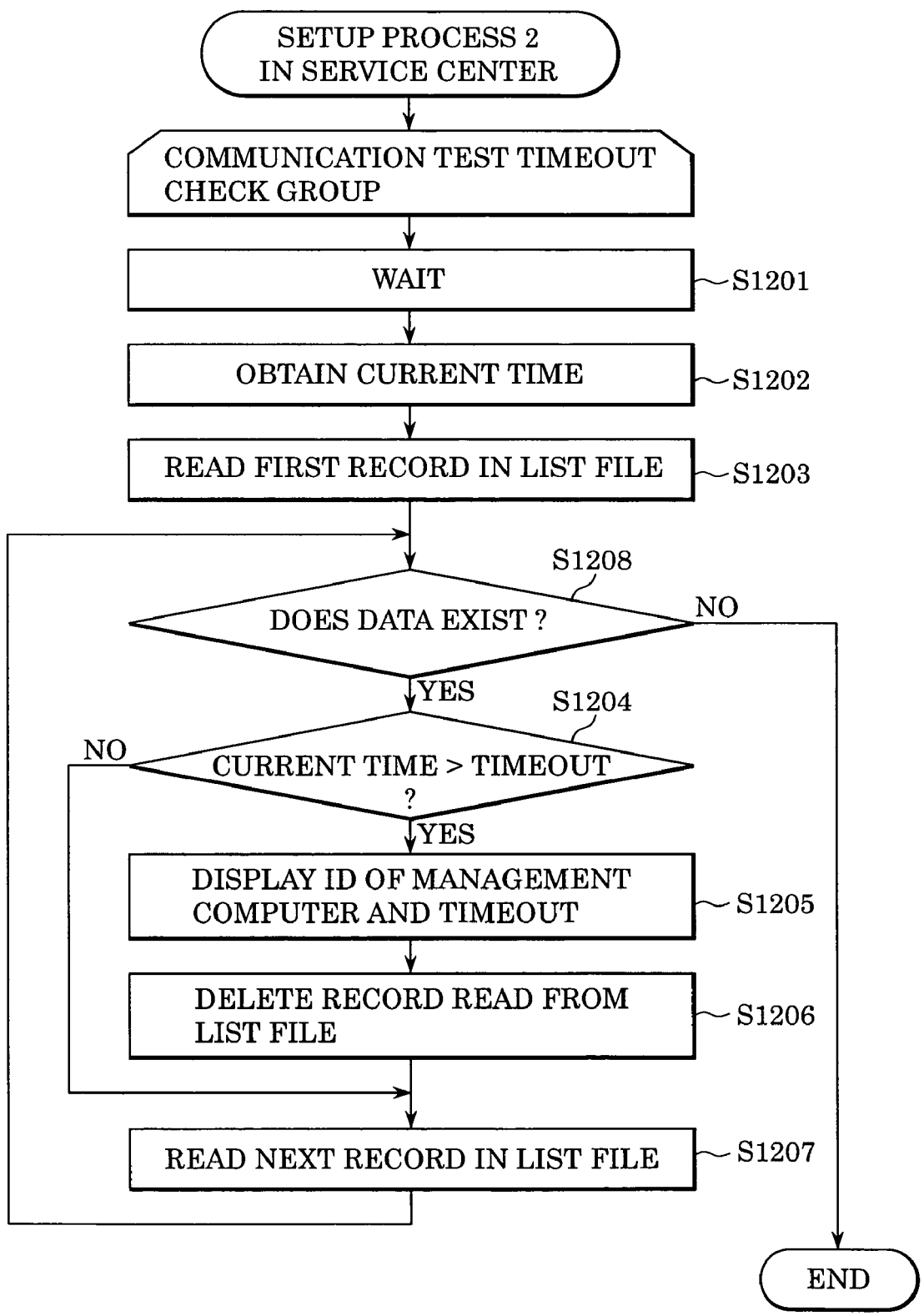
FIG. 7 is a flowchart showing a process performed in the service center according to the first embodiment.

FIG. 4 shows a sequence diagram of the entire system, FIGS. 5A and 5B show a flowchart of a process performed in the management computer 101, and FIGS. 6 to 9 show flowcharts of processes performed in the service center 105. Hereinafter, operations of the embodiment will be described with reference to these figures.

First, an overview of a setup process is described with reference to FIG. 4. A person who sets up the management computer 101 connects the management computer 101 to a network and turns on power (S901). Upon power-up of step S901, the management computer 101 starts. At the same time as or after the power-up, the management computer 101 obtains network information including an IP address, a subnet mask, and a default gateway of the management computer 101 and a DNS (domain name system) server address from the DHCP server 812 by using DHCP (S902). The obtaining timing in step S902 may be automatically set, or may be triggered by pushing a button of the management computer 101 or triggered by an input of a command for performing step S902 to the management computer 101.

Then, a MAC (media access control) address serving as ID (identification) information of the management computer 101 is obtained by using a command. The MAC address is used as the ID information of the management computer 101 in this embodiment, but any type of information may be used as the ID information as long as it can clearly identify the management computer 101.

The management computer 101 transmits a SOAP message requesting a list of monitored devices (devices to be monitored by the management computer 101) to an address of the service center 105 (e.g., an IP address, a URL address, an e-mail address, or a telephone number), the address being written in the environment information file 811 in advance (S903). At this time, the MAC address of the management computer 101 is written in the SOAP message. The service center 105 receives and analyzes the SOAP message and obtains the MAC address of the management computer 101 and the request for a list of monitored devices (S904).

Then, the service center 105 obtains a management computer ID and a list of serial numbers and IP addresses of the devices 802 monitored by the management computer 101 from the database by using the MAC address as a key. Then, the service center 105 transmits a SOAP response including the management computer ID and the list (S905). The management computer 101 receives the SOAP response and transmits a request for counter information to all of the devices on the list (S906).

After obtaining counter information from the devices (S907), the management computer 101 writes the ID thereof and counter values of all of the monitored devices in a SOAP message and transmits the SOAP message to the service center 105 (S908). The service center 105 receives the SOAP message, stores the counter values of all of the devices in the counter information table 838 (S909), and displays the counter information on the screen (S910).

Finally, an operator of the service center 105 determines that the counter information has been obtained on the screen (S911) and notifies the person who sets up the management computer 101 that the setup has been completed. A notification method used at this time may be, for example via an e-mail and/or telephone.

FIGS. 5A and 5B show a flowchart of a process performed in the management computer 101 according to this embodiment. The management computer 101 can communicate with the service center 105 and the plurality of image forming devices 102 to 104 through a network and includes a storage unit, which stores ID information of the management computer 101 and communication information including at least address information of the service center 105. The flowchart in FIGS. 5A and 5B specifically shows a process of: reading the communication information from the storage unit of the management computer 101; accessing the service center 105 through a network by using the address information of the service center 105 included in the communication information and the ID information of the management computer 101; receiving, from the service center 105, device ID information for identifying the respective image forming devices stored (set) in the service center while being associated with the ID information of the management computer 101; and performing a communication test between the management computer 101 and the image forming devices corresponding to the received device ID information. A program for executing the flowchart shown in FIGS. 5A and 5B is stored in the ROM of the management computer 101, is read by the RAM, and is executed by the CPU.

After the management computer 101 starts, the network information obtaining unit 805 reads a setup flag from the environment information file 811 (S1001) and checks whether setup has been done (S1002). If setup has been done (yes in S1002), the setup flag indicates that setup has been done and processing ends. If setup has not been done (no in S1002), the network information obtaining unit 805 obtains network information including an IP address, a subnet mask, and a default gateway of the management computer 101 and a DNS server address from the DHCP server 812 through the LAN communication unit 804 (S1003).

If it is determined that network information has not been obtained (no in S1004), an LED (light emitting diode) controller 813 allows an LED on the management computer 101 to flash (S1014) and the setup process ends. On the other hand, if the network information has been obtained (yes in S1004), a MAC address of the management computer 101 is obtained by using an internal command "ipconfig" or "ifconfig" based on the network information obtained by the network information obtaining unit 805 (S1005). The MAC address may be included in the environment information file 811.

Then, the SOAP message generator 807 reads an address for specifying the service center 105 from the environment information file 811 (communication information) in step S1006. Further, the SOAP message generator 807 generates a SOAP message of requesting a list of monitored devices by using the obtained MAC address as an identifier, and transmits the SOAP message to the service center 105 through the SOAP communication unit 809 and the Internet 810 (S1007). A specific example of the SOAP message is shown in FIG. 15.

If the management computer 101 fails in communication with the service center 105 (no in S1008), the LED controller 813 allows the LED to flash (S1014) and the setup process ends. If the SOAP communication unit 809 receives a SOAP response from the service center 105 (yes in S1008), the SOAP message analyzer 808 analyzes the SOAP response, so that the management computer ID and a list of serial numbers and IP addresses of all of monitored devices are obtained from the SOAP response (S1009). A specific example of the SOAP response is shown in FIG. 16. The content of the SOAP response is not limited to that shown in FIG. 16, but it must include at least information for identifying the monitored devices on which a communication test is performed in the subsequent steps from step S1011 or information required for communicating with each identified device. The communication test is performed between the management computer 101 and the plurality of image forming devices based on the information shown in FIG. 16.

If the SOAP response includes neither the management computer ID nor the list of serial numbers and IP addresses of monitored devices, the process of setting up the management computer 101 ends. At this time, a preliminary data setting error is displayed on the screen of the service center 105. Details of this are described later with reference to the flowchart shown in FIG. 6.

If the SOAP response includes the management computer ID and the list of serial numbers and IP addresses of monitored devices (yes in S1010), the ID and the list are stored in the environment information file 811 (S1011). Then, the counter information obtaining unit 806 reads the list of the serial numbers and the IP addresses from the environment information file 811 and initializes the number X of devices to which a count request has been transmitted (sets X to 0 (zero)) so as to start to obtain counter information (S1012).

The counter information obtaining unit 806 obtains a serial number from the device 802 of an X-th IP address on the list through the LAN communication unit 804 (S1013). If the serial number cannot be obtained (no in S1015 of FIG. 5B), a counter value of the X-th device 802 is set to a predetermined value (e.g., −3) and the value is stored in a memory (S1027). This predetermined value (in this example, −3) is internally read from the storage unit of the management computer 101. A reason that the serial number cannot be obtained may be: because a power of the monitored device is interrupted or because an IP address is wrong. After step S1027, X is incremented by 1 (S1021). When X reaches the number of monitored devices (S1022), the counter information obtaining process ends and the process proceeds to step S1023. While X is smaller than the number of monitored devices, the counter information obtaining process continues (S1013 of FIG. 5A).

If the serial number can be obtained in step S1013 (yes in S1015), the counter information obtaining unit 806 compares the serial number obtained from the device with an X-th serial number in the SOAP message (S1016).

If the serial number obtained from the device does not match the X-th serial number in the SOAP message (no in S1017), a counter value of the X-th device 802 is set to a predetermined value (−2 in this example) and the value is stored in the memory (S1028). Then, X is incremented by 1 (S1021). When X reaches the number N of monitored devices (S1022), the counter information obtaining process ends and the process proceeds to step S1023. While X is smaller than the number N of monitored devices, the counter information obtaining process is continued from step S1013 of FIG. 5A.

If the serial number obtained from the device matches the X-th serial number in the SOAP message (yes in S1017), the counter information obtaining unit 806 obtains a counter value from the IP address of the X-th device 802 through the LAN communication unit 804 (S1018). If the counter value cannot be obtained (no in S1019), the counter value of the X-th device 802 is set to a predetermined value (−1 in this example) and the value is stored in the memory (S1029). Then, X is incremented by 1 (S1021). When X reaches the number N of monitored devices (S1022), the counter information obtaining process ends and the process proceeds to step S1023. While X is smaller than the number N of monitored devices, the counter information obtaining process is continued from step S1013 of FIG. 5A. If the counter value of the X-th device 802 has been obtained (yes in S1019), the counter value is stored in the memory (S1020).

Then, X is incremented by 1 (S1021). When X reaches the number N of monitored devices (S1022), the counter information obtaining process ends and the process proceeds to step S1023. While X is smaller than the number N of monitored devices, the counter information obtaining process is continued from step S1013 of FIG. 5A. After counter information of all of the monitored devices has been obtained, the SOAP message generator 807 reads the management computer ID from the environment information file 811. Then, the SOAP message generator 807 generates a SOAP message of requesting a communication test, the message including the ID and the counter information, and transmits the SOAP message to the service center 105 through the SOAP communication unit 809 and the Internet 810 (S1023). A specific example of the SOAP message is shown in FIG. 17.

If it is determined in Step S1025 that an affirmative response was received from the service center 105 in step S1024, the SOAP message analyzer 808 sets the setup flag in the environment information file 811 to "done" (S1026) so as to end the setup process. At this time, the transmitted counter information is displayed on a communication test result screen of the service center 105. If a negative response is received from the service center 105 (no in S1025), the setup process ends without setting the setup flag. At this time, a counter information storage error is displayed on the communication test result screen of the service center 105.

In this embodiment, if a counter value cannot be read, a value from −1 to −3 is set as the counter value, which enables the service center 105 to determine whether or not the counter value has been read and a cause of failure. However, the present invention is not limited to this method, but another predetermined code (value) may be set. Alternatively, if the management computer 101 is capable of transmitting additional information together with counter information to the service center 105, information indicating whether a counter value has been read or not and a cause of failure may be transmitted separately from the counter value.

The service center 105 can determine that a counter value has been obtained after step S1018. This reliably leads to accounting in the service center 105. Further, a counter value of each image forming device obtained in step S1018 corresponds to the number of printed sheets or the like in a test performed by a service person during setup of the image forming device. Therefore, the counter value can be used as information for discriminating what is not charged.

In step S1023 of the flowchart shown in FIG. 5B, a communication test message including the management computer ID and the counter information of all of the monitored devices is transmitted to the service center 105, which has a display control unit for allowing the service center 105 to check a result of a communication test. Alternatively, by storing the same information as that transmitted in step S1023 in the storage unit of the management computer 101, connecting a notebook PC (personal computer) or the like to the management computer 101, and by outputting a result of a communication test from the storage unit of the management computer 101 to the notebook PC, a service person can easily check in situ whether setup has been successfully done. Further, by outputting a communication test result to an external notebook PC so that a communication test failure can be recognized if the failure occurs in any of the plurality of image forming devices, the service person can check a success/failure of the setup process more accurately.

After the setup process shown in FIGS. 5A and 5B normally ends, the management computer 101 can normally communicate with all of the monitored image forming devices. Accordingly, a maintenance service is started, so that a device managing unit of the management computer 101 manages counter values of the image forming devices and errors such as a paper jam based on the device identifying information shown in FIG. 16.

FIG. 6 is a flowchart of a process performed in the service center 105 of this embodiment. A program for executing the flowchart shown in FIG. 6 is stored in the ROM of the remote service center 105, is read by the RAM, and is executed by the CPU. First, the center SOAP communication unit 831 of the service center 105 receives a SOAP message through the Internet 810 (S1101). An example of the received message is the same as that shown in FIG. 15. The center SOAP message analyzer 832 analyzes the SOAP message (S1102) and determines whether the message includes a request for a list of monitored devices (S1103). If the message includes a request for a list of monitored devices (yes in S1103), a device list transmitting process is performed (S1104).

Figure 8:
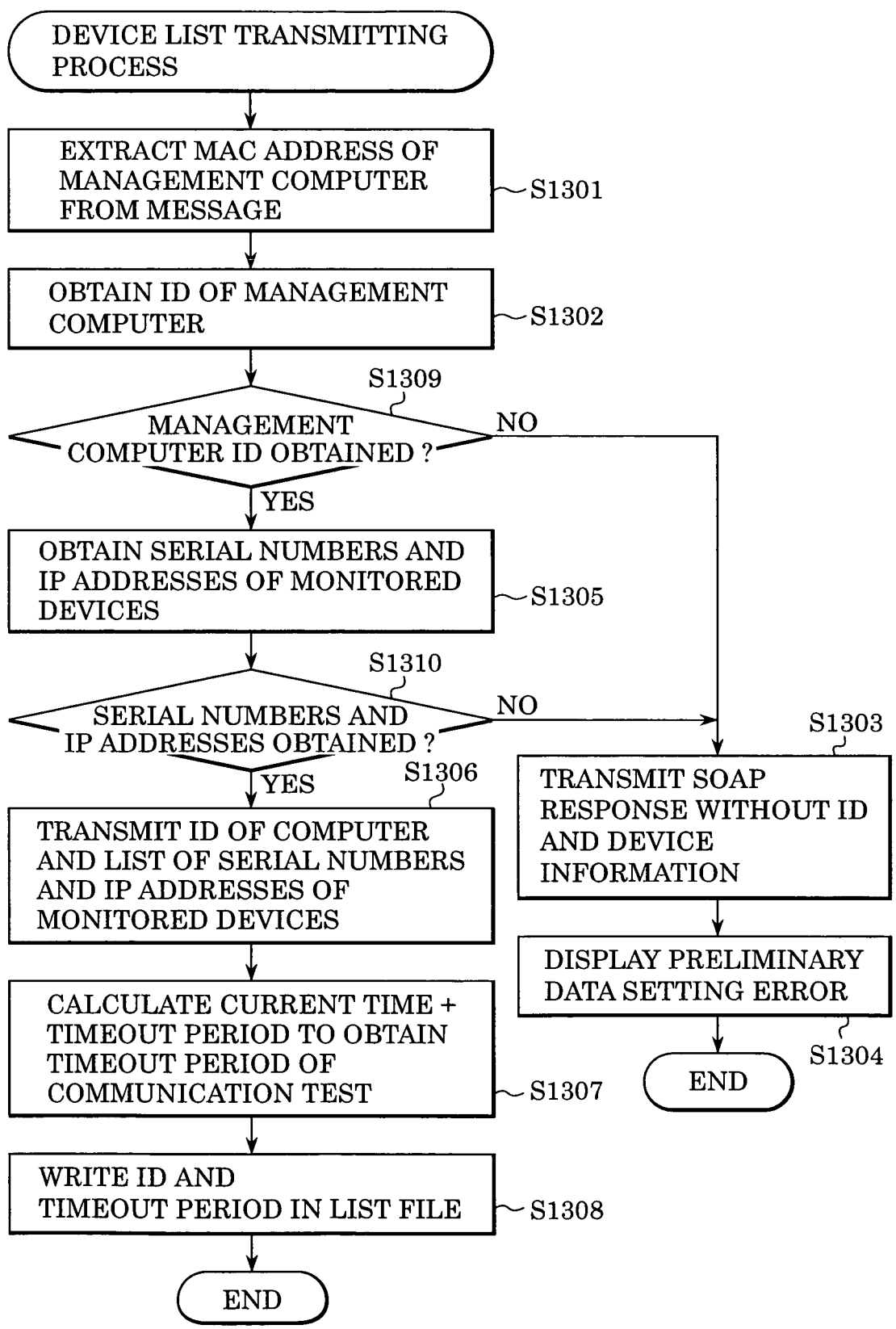
FIG. 8 is a flowchart showing a process performed in the service center according to the first embodiment.

Details of the transmit device list process of step S1104 is shown in FIG. 8 and described next. The center SOAP message analyzer 832 extracts the MAC address of the management computer 101 from the message and transmits it to the device list transmitting unit 839 (S1301). The device list transmitting unit 839 obtains the management computer ID from the management computer information table 836 through the DB access unit 835 by using the MAC address of the management computer 101 as a key (S1302).

If the management computer ID cannot be obtained from the management computer information table 836 (no in S1309), the device list transmitting unit 839 determines that the management computer 101 is not registered in the table and calls the center SOAP message generator 833 without the management computer ID and serial numbers and IP addresses of the devices. The center SOAP message generator 833 transmits a SOAP response without the ID and the serial numbers and IP addresses of the devices (S1303). An example of the SOAP response is shown in FIG. 16. Then, a preliminary data setting error is displayed on the screen (S1304) and the process ends.

If the management computer ID can be obtained from the management computer information table 836 (yes in S1309), the device list transmitting unit 839 obtains serial numbers and IP addresses of devices monitored by the management computer 101 having the obtained ID from the device information table 837 through the DB access unit 835 (S1305). If the serial numbers and IP addresses of the devices monitored by the management computer 101 cannot be obtained from the device information table 837 (no in S1310), the device list transmitting unit 839 calls the center SOAP message generator 833 without the management computer ID and the serial numbers and IP addresses of the devices.

The center SOAP message generator 833 transmits a SOAP response without the management information ID and the serial numbers and IP addresses of the devices (S1303). An example of the SOAP response is shown in FIG. 16. Then, a preliminary data setting error is displayed on the screen (S1304) and the process ends.

If the serial numbers and IP addresses of the devices monitored by the management computer 101 having the obtained ID can be obtained from the device information table 837 (yes in S1310), the device list transmitting unit 839 transmits the ID and the serial numbers and the IP addresses of the devices to the center SOAP message generator 833 (S1306). The center SOAP message generator 833 transmits a SOAP response including the ID and the serial numbers and the IP addresses of the devices. An example of the SOAP response is shown in FIG. 16.

Then, the device list transmitting unit 839 calculates "current time +timeout period" to obtain "timeout period of a communication test" (S1307), and writes the management computer ID and the timeout period of a communication test in a communication test standby list file 842 (S1308). An example of the communication test standby list file is shown in FIG. 10. Processing of FIG. 6 of transmitting a device list then ends.

The management computer 101 receives the list of monitored devices in the SOAP response, obtains counter information from the devices, and transmits a SOAP message of requesting a communication test to the service center 105. The SOAP message is received by the center SOAP communication unit 831 of the service center 105 through the Internet 801 (S1101 in FIG. 6). An example of the SOAP message is shown in FIG. 15. Then, the center SOAP message analyzer 832 analyzes the SOAP message (S1102) and determines whether the message list includes a request for the list of monitored devices (S1103). If the message list does not include a request for the list of monitored devices (no in S1103), it is determined whether the message includes counter information of a communication test (S1105). If the message includes a request for a communication test (yes in S1105), a communication test is performed (S1106).

Figure 9:
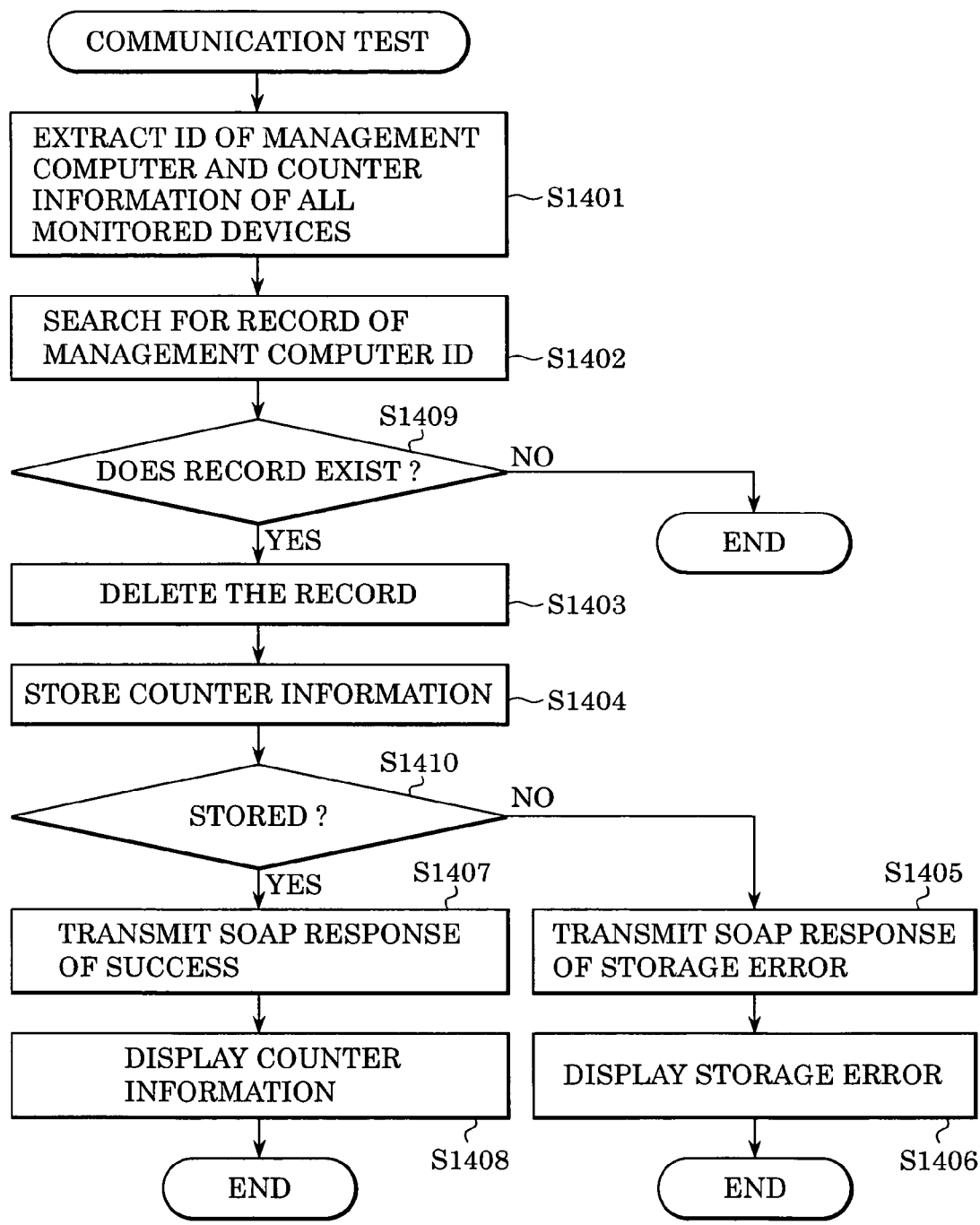
FIG. 9 is a flowchart showing a process performed in the service center according to the first embodiment.

FIG. 9 is a flowchart illustrating details of the communication test of step S1106 and is described next. The center SOAP message analyzer 832 extracts the management computer ID from the message and transmits it to a communication test unit 840 (S1401). The communication test unit 840 searches the communication test standby list file 842 for a record corresponding to the management computer ID (S1402). If the record does not exist (no in S1409), the timeout of a communication test is over, and thus the communication test process ends. A timeout checking process is described later with reference to the flowchart shown in FIG. 7.

If the record of the corresponding management computer ID exists (yes in S1409), the communication test unit 840 deletes the record on the communication test standby list file 842 (S1403). Then, the communication test unit 840 stores the counter information in the counter information table 838 through the DB access unit 835 (S1404). If the counter information cannot be stored in the counter information table 838 (no in S1410), the communication test unit 840 notifies the center SOAP message generator 833 of a counter storage error, so that the center SOAP message generator 833 transmits a SOAP response including a negative response (S1405). An example of the SOAP response is shown in FIG. 18. Then, the communication test unit 840 displays the management computer ID and the storage error on the screen (S1406) and ends the setup process.

If the counter information can be stored in the counter information table 838 (yes in S1410), the communication test unit 840 notifies the center SOAP message generator 833 of a success in storage, so that the center SOAP message generator 833 transmits a SOAP response including an affirmative response (S1407). An example of the SOAP response is shown in FIG. 18. The communication test unit 840 displays the management computer ID and the counter information of all of the monitored devices on the screen (S1408) and ends the setup process. The operator of the service center 105 checks the displayed counter information of all of the monitored devices and notifies the person who performed setup that setup has been completed.

If a communication test message is not transmitted from the management computer within a predetermined period after the device list transmitting process shown in FIG. 8, information indicating that a timeout of a communication test occurs is displayed on the screen. A process of checking a timeout is described next with reference to the flowchart shown in FIG. 7. A timeout check unit 841 waits for a predetermined period (S1201) and obtains a current time from the system (S1202).

Then, the timeout check unit 842 reads a first record in the communication test standby list file 842 (S1203). If data to be read does not exist (no in S1208), the process ends and restarts from S1201 to wait for the predetermined period. If the data exists (yes in S1208), the timeout check unit 842 checks whether the current time is greater than a timeout period (S1204). If the current time is not greater than the timeout period (no in S1204), the timeout has not yet occurred, and thus a next record in the list file is read (S1207).

If the current time is greater than the timeout period, the timeout has occurred, and the timeout check unit 841 displays the management computer ID and timeout (S1205) and deletes the read record in the list file (S1206). Then, the timeout check unit 841 reads a next record in the list file (S1207). If there is no next record (no in S1208), the process returns to step S1201 to wait for the predetermined period. If there is a next record (yes in S1208), the timeout check unit 841 checks whether the current time is greater than the timeout period (S1204). These steps are repeated to check for a timeout of a communication test.

According to the above-described embodiment, by starting a management computer, counter information of monitored devices can be checked and completion of setup can be determined on the service center side. Accordingly, a setup failure due to a data input error can be avoided and time required for a setup process can be significantly reduced compared to a method of connecting a mobile notebook PC to a management computer and setting monitored devices on the management computer from the notebook PC. Further, a cost of educating people who perform a setup process can be significantly reduced. If the LED flashes during the setup process, the network environment has some problems. In this case, the setup process is restarted after realizing a state where the management computer and the DHCP server can communicate with each other or a state where the management computer can access the Internet.

In this embodiment, the MAC address is obtained by allowing the network information obtaining unit to use an internal command. However, the MAC address may be obtained by another method, for example, by using ARP (address resolution protocol). In addition, the timeout period illustrated in the flowcharts shown in FIGS. 7 and 8 and the waiting time in step S1201 may be arbitrarily set.

Second Embodiment

Next, a second embodiment of the present invention is described with reference to FIGS. 11, 12A, 12B, and 13.

Figure 11:
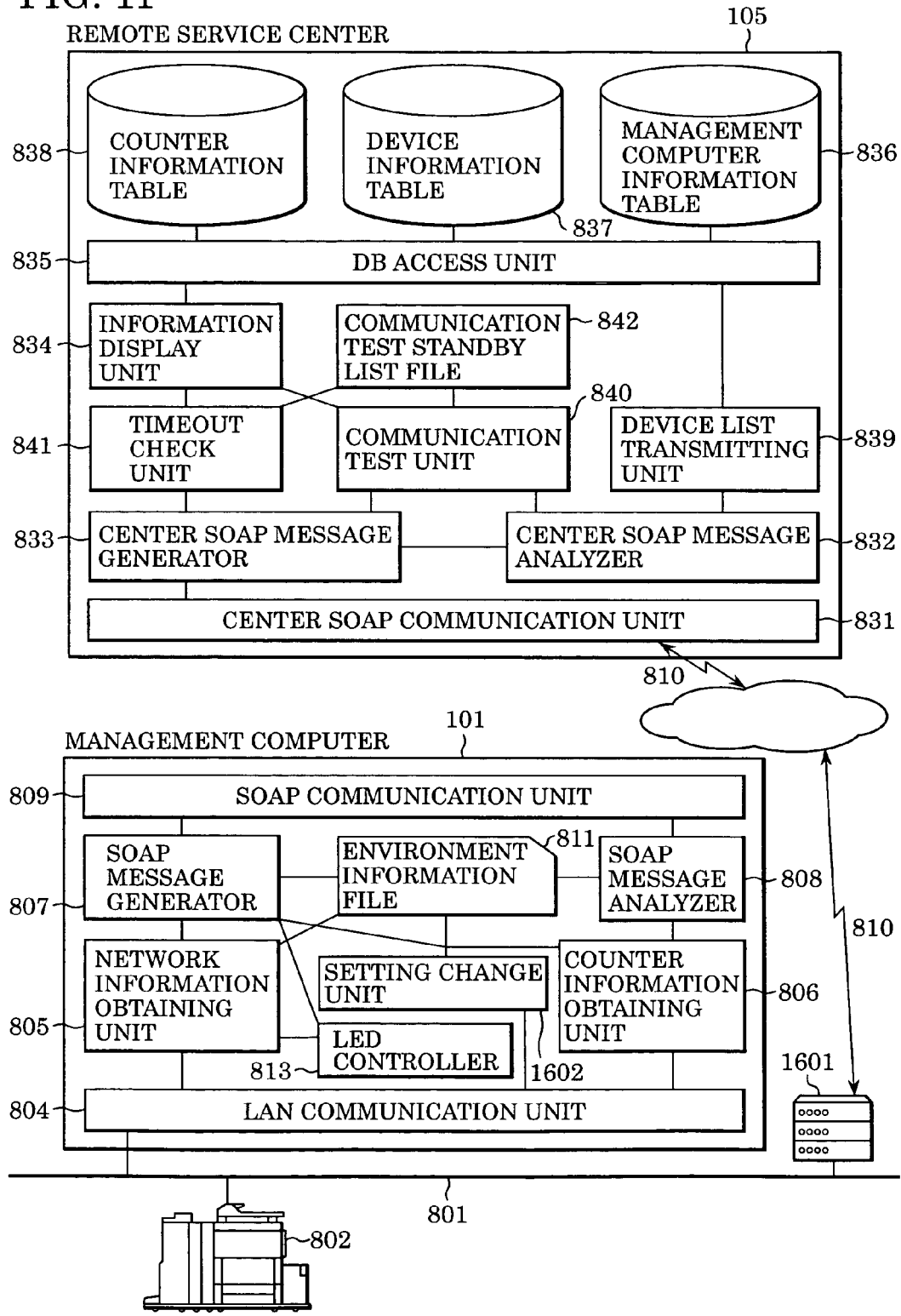
FIG. 11 is a block diagram showing a configuration of a device managing system according to a second embodiment.

FIG. 11 is a block diagram showing a configuration of a system for managing devices according to the second embodiment. In FIG. 11, parts that are the same as those of the first embodiment shown in FIG. 3 are denoted by the same reference numerals. The configuration shown in FIG. 11 is different from that shown in FIG. 3 in that: a proxy 1601 is added so that communication with an external device is performed through the proxy; that the DHCP server 812 is not provided; that network information of the management computer 101 and an address and a port number of the proxy 1601 are set in advance in the environment information file 811 by a preliminary search; and that an environment information changing unit 1602 enabling changes of environment setting from a Web screen is provided.

Figure 12B:
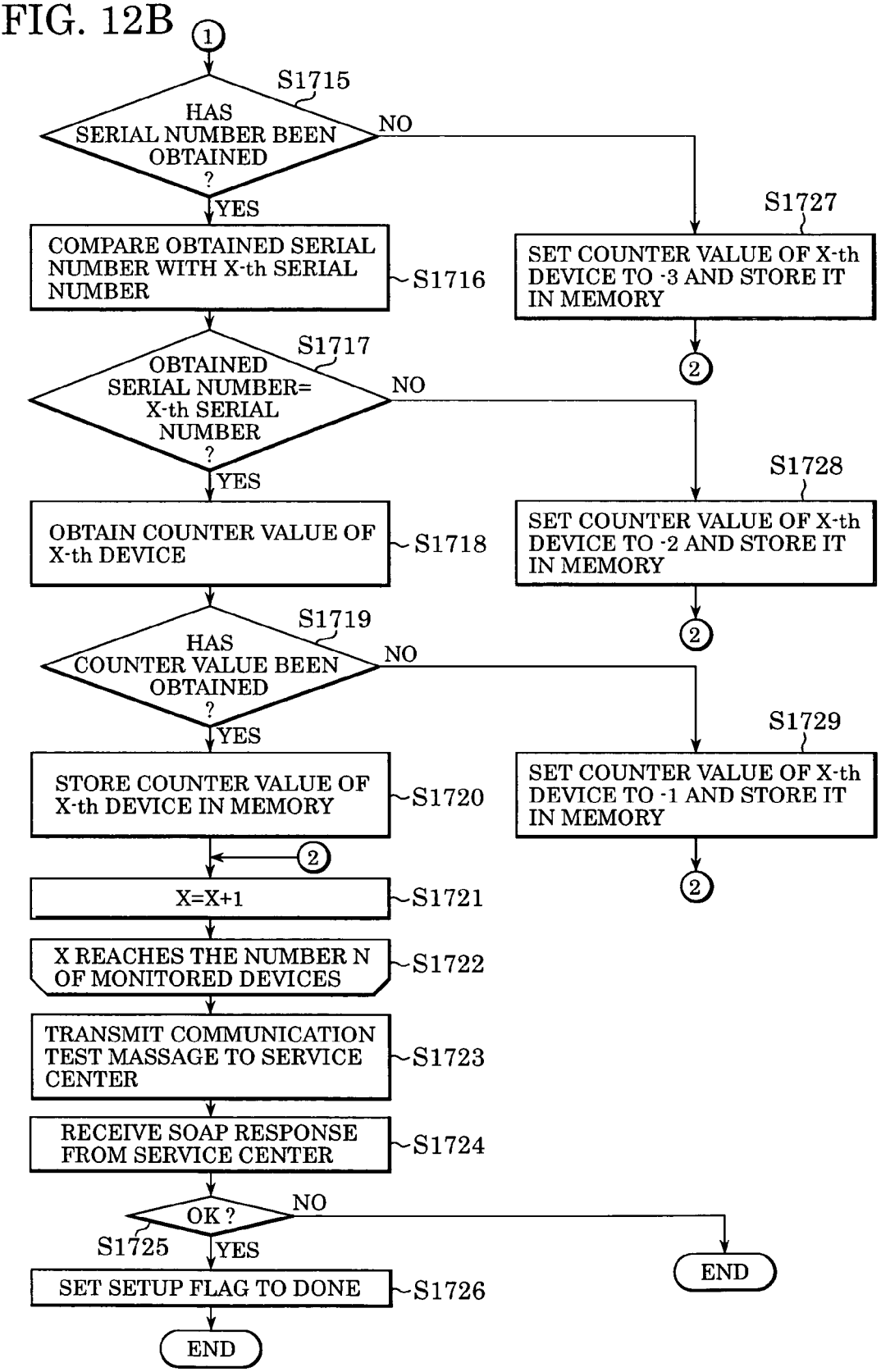
Figure 13:
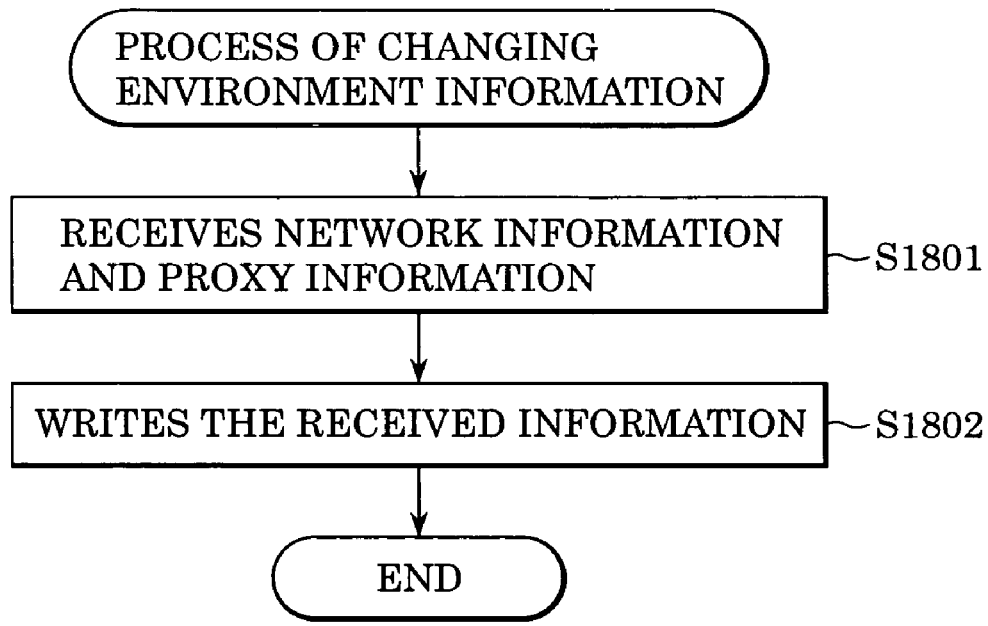
FIG. 13 is a flowchart showing a process performed in the management computer according to the second embodiment.

Hereinafter, an operation of the device managing system according to this embodiment will be described with reference to the flowchart shown in FIGS. 12A and 12B. A program for executing the flowchart shown in FIGS. 12A and 12B is stored in the flash ROM 204 of the management computer 101, is read by the RAM 203, and is executed by the CPU 201.

After the management computer 101 starts, the network information obtaining unit 805 reads a setup flag from the environment information file 811 (S1701) and checks whether setup has been done (S1702). If the setup has been done (yes in S1702), processing ends. On the other hand, if the setup has not been done (no in S1702), the network information obtaining unit 805 tries to obtain network information, including an IP address, a subnet mask, and a default gateway of the management computer 101 and a DNS server address, from the DHCP server 812 through the LAN communication unit 804 (S1703A). However, since the DHCP server 812 does not exist in this embodiment, the network information cannot be obtained therefrom (no in S1704). Accordingly, the network information is obtained from the environment information file 811 (S1703B).

Then, the network information obtaining unit 805 obtains the MAC address of the management computer 101 by using an internal command "ipconfig" or "ifconfig" (S1705). Then, the SOAP message generator 807 reads an address of the service center from the environment information file 811 (S1706). Then, the SOAP message generator 807 generates a SOAP message of requesting a list of monitored devices by using the obtained MAC address as an identifier and transmits the SOAP message to the service center 105 through the SOAP communication unit 809 and the Internet 810 (S1707A). A specific example of the SOAP message is shown in FIG. 15.

However, since the DHCP server 812 does not exist in this embodiment, the management computer 101 cannot communicate with the service center 105 (no in S1708). In this case, an address and a port number of the proxy 1601 is obtained from the environment information file 811 (S1707B) and then the SOAP message is transmitted to the address and the port number of the proxy 1601 (S1707C). If the management computer 101 cannot communicate with the service center 105 through the proxy 1601 (no in S1709), the LED controller 813 allows the LED of the management computer 101 to flash (S1714) and the setup process ends.

After the SOAP communication unit 809 receives a SOAP response from the service center 105 (yes in S1709), the SOAP message analyzer 808 analyzes the received SOAP message, so that the management computer ID and serial numbers and IP addresses of all of monitored devices are obtained from the SOAP response (S1707D). A specific example of the SOAP response is shown in FIG. 16.

If the SOAP response includes neither the management computer ID nor serial numbers and IP addresses of monitored devices (no in S1710), the setup process in the management computer 101 ends. At this time, a preliminary data setting error is displayed on the screen of the service center 105. The subsequent steps S1711 to S1729 are the same as the corresponding steps of the flowchart shown in FIGS. 5A and 5B, and thus the descriptions thereof will not be repeated here.

Figure 14:
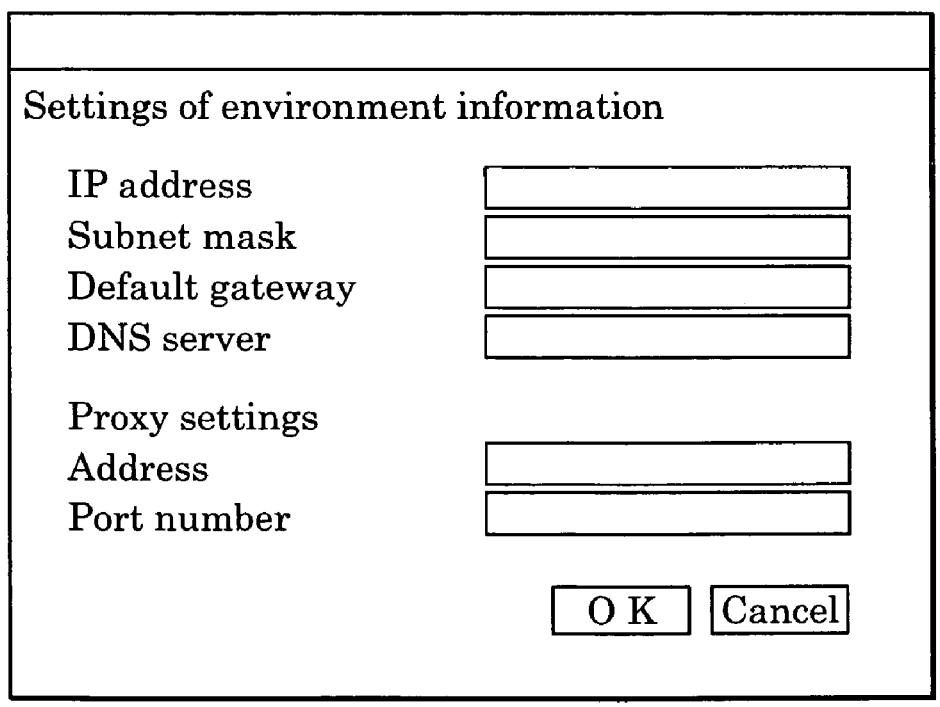
FIG. 14 shows an environment information changing screen according to the second embodiment.

If network information or proxy information is invalid, an error occurs during a setup process and the process cannot be continued. In that case, the information must be corrected. Now, a method for changing network information and proxy information will be described with reference to FIGS. 13 and 14. When a person who performs setup connects a PC to the network 801 and accesses the management computer 101 by using a browser, the environment information changing unit 1602 displays an environment information setting screen such as the one shown in FIG. 14.

The person who performs setup inputs correct network information and proxy information and pushes an OK button. With this operation, the environment information changing unit 1602 receives the network information and the proxy information (S1801 of FIG. 13) and writes the information in the environment information file 811 (S1802). After that, by turning OFF/ON the power of the management computer 101 again, a setup process can be restarted with new settings. The operation performed in the service center 105 is the same as that of the first embodiment shown in the flowcharts in FIGS. 6, 7, and 8.

According to the second embodiment, the DHCP server 812 does not exist and the management computer uses a proxy to communicate with an external device. Even in this network environment, counter information of the devices 802 can be checked and whether a setup process has been done can be determined on the service center 105 side after the management computer starts. Accordingly, as in the first embodiment, a setup failure due to a data input error can be avoided and time required for a setup process can be significantly reduced compared to a method of connecting a mobile notebook PC to the management computer 101 and setting monitored devices on the management computer from the notebook PC.

A cost of educating people who perform a setup process can be significantly reduced. Further, even if a setup process could not be done due to a preliminary input error of environment information, the environment information can be corrected from a browser by using a PC, so as to restart the setup process with new settings.

In this embodiment, the MAC address is obtained by allowing the network information obtaining unit to use an internal command. Alternatively, the MAC address may be obtained by another method, for example, by using ARP. In addition, the timeout period mentioned with reference to the flowcharts shown in FIGS. 7 and 8 and the waiting time in step S1201 may be arbitrarily set.

Third Embodiment

In the first and second embodiments, a SOAP response is received just after steps S1007 and S1707A, respectively. However, the embodiments are not limited to this manner. For example, the history of step S1007 or S1707A may be stored in the service center. Then, the service center may asynchronously check the history to perform the following steps after step S1007 or S1707A. In particular, by allowing the service center to remotely change various settings, such as an IP address, caused by a failure in a communication test with the devices in a counter information obtaining process and by adapting the management computer to the remote change, waiting time of a service person can be advantageously reduced.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-170463 filed Jun. 8, 2004, which is hereby incorporated by reference herein.

What is claimed is:

1. An information processing apparatus comprising:
   a communication unit configured to communicate with a service center and a plurality of image forming devices through a network;
   a storage unit configured to store identifying information of the information processing apparatus and address information of the service center;
   a reading unit configured to read the address information of the service center from the storage unit;
   an accessing unit configured to access the service center through the network by using the address information of the service center read by the reading unit and the identifying information of the information processing apparatus;
   a monitored device information receiving unit configured to receive monitored device information including a serial number and address information of the respective image forming devices to be monitored by the information processing apparatus from the service center accessed by the accessing unit, the monitored device information is associated with the identifying information of the information processing apparatus in the service center; and
   a device managing unit configured to manage the plurality of image forming devices corresponding to the monitored device information received by the monitored device information receiving unit through the network,
   wherein the device managing unit comprises:
      a counter information receiving unit configured to receive counter information from the respective image forming devices connected through the network based on the monitored device information, the counter information indicating the number of image forming operations performed in the image forming device;
      a device information storage unit configured to store device information as the counter information; and
      a device information transmitting unit configured to transmit the device information stored as counter information by the device information storage unit to the service center through the communication unit;

wherein the device information storage unit stores:

the counter information received by the counter information receiving unit if a serial number obtained based on address information of the image forming device included in the monitored device information has matched a serial number of the image forming device included in the monitored device information, and the counter information receiving unit has received the counter information from the image forming device, first predetermined information as the counter information indicating that a serial number cannot be obtained if the serial number has not been obtained based on address information of the image forming device included in the monitored device information, second predetermined information as the counter information indicating a mismatch of a serial number if the serial number obtained based on address information of the image forming devise included in the monitored device information has not matched a serial number of the image forming device included in the monitored device information, and third predetermined information as the counter information indicating that the counter information cannot be obtained if the counter information receiving unit has not received the counter information from the image forming device included in the monitored device information, wherein the first predetermined information and the second predetermined information and the third predetermined information are different values, and wherein the service center and the plurality of image forming devices are connected through the information processing apparatus.

2. The information processing apparatus according to claim 1, further comprising:

a test unit configured to perform a communication test on the plurality of image forming devices corresponding to the device identifying information received by the device identifying information receiving unity through the network; and an output unit configured to output a result of the communication test performed by the test unit.

3. The information processing apparatus according to claim 2, wherein the output unit is configured to output the result so that a communication test failure can be recognized if the failure occurs in any of the plurality of image forming devices.

4. The information processing apparatus according to claim 1, wherein the communication unit is configured to perform communication by using a protocol that realizes an exchange of messages without depending on a transmission procedure.

5. The information processing apparatus according to claim 4, wherein the communication unit comprises:

a Simple Object Access Protocol transmitting unit configured to generate a Simple Object Access Protocol message and to transmit the Simple Object Access Protocol message to the service center through the network; and a Simple Object Access Protocol receiving unit configured to receive a Simple Object Access Protocol message from the service center through the network and to analyze the Simple Object Access Protocol message, and the communication unit performs communication by using a Simple Object Access Protocol.

6. An information processing system including a service center performing communication through a network, a plurality of image forming devices performing communication through the network, and an information processing apparatus communicating with the service center and the respective image forming devices through the network, the service center comprising:

a center storage unit configured to store monitored device information associated with identifying information of the information processing apparatus, the monitored device information including a serial number and address information of the respective image forming devices to be monitored by the information processing apparatus; and a monitored device information transmitting unit configured to transmit the monitored device information to the information processing apparatus by reading the monitored device information from the center storage unit upon receiving a request from the information processing apparatus, and the information processing apparatus comprising:

a storage unit configured to store address information of the service center and the identifying information of the information processing apparatus;

a reading unit configured to read the address information of the service center from the storage unit;

an accessing unit configured to access the service center through the network by using the address information of the service center read by the reading unit and the identifying information of the information processing apparatus;

a monitored device information receiving unit configured to receive the monitored device information associated with the identifying information of the information processing apparatus from the service center accessed by the accessing unit; and a device managing unit configured to manage the plurality of image forming devices corresponding to the monitored device information received by the monitored device information receiving unit through the network, wherein the device managing unit comprises:

a counter information receiving unit configured to receive counter information from the respective image forming devices connected through the network based on the monitored device information, the counter information indicating the number of image forming operations performed in the image forming device;

a device information storage unit configured to store device information as the counter information; and a device information transmitting unit configured to transmit the device information stored as counter information by the device information storage unit to the service center through the communication unit;

wherein the device information storage unit stores:

the counter information received by the counter information receiving unit if a serial number obtained based on address information of the image forming device included in the monitored device information has matched a serial number of the image forming device included in the monitored device information, and the counter information receiving unit has received the counter information from the image forming device, first predetermined information as the counter information indicating that a serial number cannot be obtained if the serial number has not been obtained based on address information of the image forming device included in the monitored device information, second predetermined information as the counter information indicating a mismatch of a serial number if the serial number obtained based on address information of the image forming devise included in the monitored device information has not matched a serial number of the image forming device included in the monitored device information, and third predetermined information as the counter information indicating that the counter information cannot be obtained if the counter information receiving unit has not received the counter information from the image forming device included in the monitored device information, wherein the first predetermined information and the second predetermined information and the third predetermined information are different values, wherein the device information transmitted as the counter information enables determination of a cause for an obtainment failure of the counter information, and wherein the service center and the plurality of image forming devices are connected through the information processing apparatus.

7. The information processing system according to claim 6, further comprising:

a test unit configured to perform a communication test of the plurality of image forming devices corresponding to the monitored device information received by the monitored device information receiving unit through the network; and an output unit configured to output a result of the communication test performed by the test unit.

8. The information processing system according to claim 7, wherein the output unit is configured to output the result so that a communication test failure can be recognized if the failure occurs in any of the plurality of image forming devices.

9. An information processing method for communicating with a service center and a plurality of image forming devices through a network by using a communication unit and for managing the plurality of image forming devices, the method comprising:

reading address information from a storage unit which stores identifying information of an information processing apparatus and the address information of the service center;

accessing the service center through the network by using the address information of the service center and the identifying information of the information processing apparatus;

receiving monitored device information including a serial number and address information of the respective image forming devices to be monitored by the information processing apparatus from the service center, the monitored device information is associated with the identifying information of the information processing apparatus in the service center; and managing the plurality of image forming devices corresponding to the received monitored device information, wherein the managing comprises;

receiving counter information from the respective image forming devices connected through the network based on the monitored device information, the counter information indicating the number of image forming operations performed in the image forming device;

storing device information as the counter information; and transmitting the device information stored as counter information to the service center through the communication unit;

wherein the storing device information as the counter information comprises storing:

the counter information if a serial number obtained based on address information of the image forming device included in the monitored device information has matched a serial number of the image forming device included in the monitored device information, and the counter information has been received from the image forming device, first predetermined information as the counter information indicating that a serial number cannot be obtained if the serial number has not been obtained based on address information of the image forming device included in the monitored device information, second predetermined information as the counter information indicating a mismatch of a serial number if the serial number obtained based on address information of the image forming devise included in the monitored device information has not matched a serial number of the image forming device included in the monitored device information, and third predetermined information as the counter information indicating that the counter information cannot be obtained if the counter information has not been received from the image forming device included in the monitored device information, wherein the first predetermined information and the second predetermined information and the third predetermined information are different values.

10. The information processing method according to claim 9, further comprising:

performing a communication test on the plurality of image forming devices corresponding to the device identifying information received; and outputting a result of the communication test performed.

11. The information processing method according to claim 10, wherein the result of the communication test performed is output so that a communication test failure can be recognized if the failure occurs in any of the plurality of image forming devices.

12. The information processing method according to claim 9, wherein the communication unit performs communication by using a protocol that realizes an exchange of messages without depending on a transmission procedure.

13. The information processing method according to claim 12, wherein the communication unit performs steps comprising:
  generating a Simple Object Access Protocol message;
  transmitting the Simple Object Access Protocol message to the service center through the network;
  receiving a Simple Object Access Protocol message from the service center through the network; and
  analyzing the Simple Object Access Protocol message, and wherein the communication unit performs communication by using a Simple Object Access Protocol.

14. A computer-readable storage medium storing a program for allowing a computer to execute an information processing method for communicating with a service center and a plurality of image forming devices through a network by using a communication unit and for managing the plurality of image forming devices, the program comprising steps according to claim 9.

* * * * *